W. Staehlen,
Bird Cage.
Nº 33,216. Patented Sep. 3, 1861.
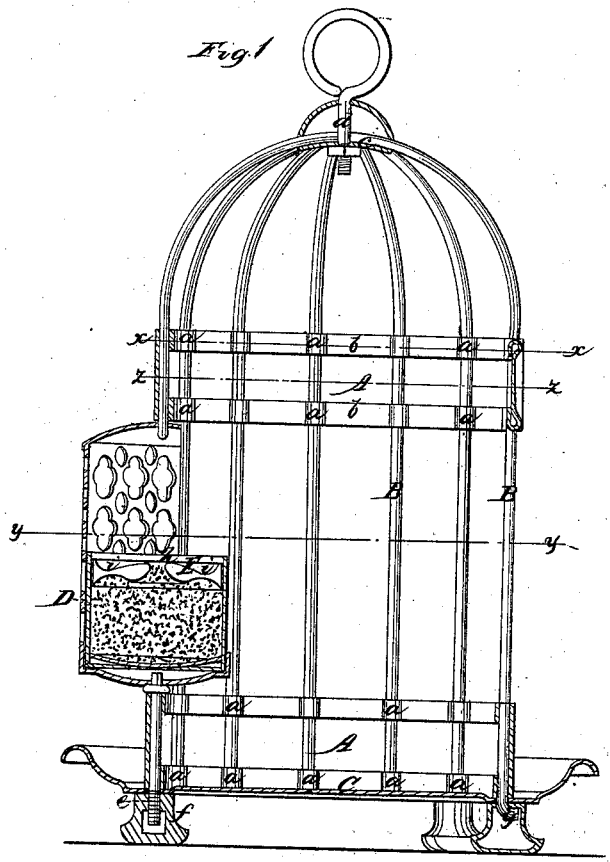
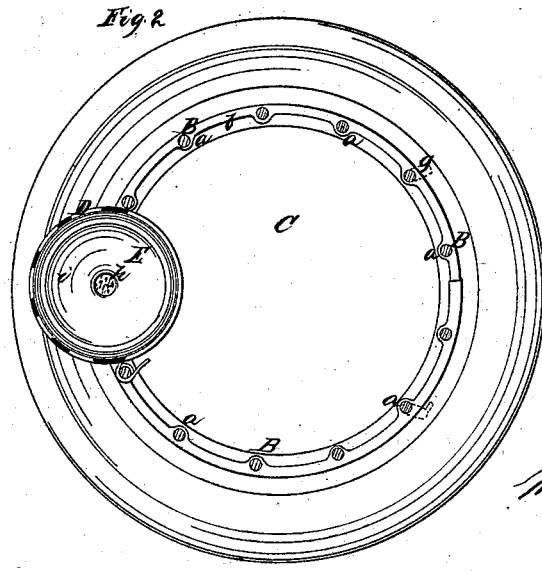
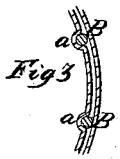
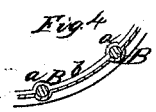
Witnesses
Inventor
William Staehlen

UNITED STATES PATENT OFFICE.

WILLIAM STAEHLEN, OF BROOKLYN, NEW YORK.

IMPROVEMENT IN BIRD-CAGES.

Specification forming part of Letters Patent No. 33,216, dated September 3, 1861.

*To all whom it may concern:*

Be it known that I, WILLIAM STAEHLEN, of Brooklyn, E. D., in the county of Kings and State of New York, have invented certain new and useful Improvements in Bird-Cages; and I do hereby declare that the following is a full, clear, and exact description of the same, reference being had to the accompanying drawings, making a part of this specification, in which—

Figure 1 represents a vertical central section of my invention. Fig. 2 is a horizontal section of the same, taken in the plane indicated by the line $y\,y$ in Fig. 1. Fig. 3 is a partial horizontal section, the line $x\,x$ in Fig. 1 representing the plane of section. Fig. 4 is a similar section taken in the plane indicated by the line $z\,z$ in Fig. 1.

Similar letters of reference indicate corresponding parts in the several figures.

This invention consists, first, in the arrangement of sockets formed by the seams of the cross-bands of a bird-cage in such a manner that the wires are sustained without the aid of solder; second, in the arrangement of a sliding disk with an opening in the interior of the seed-cup and on the top of the seed in such a manner that the bird is prevented from scattering the seed all over the cage and the room, and he is at the same time permitted to take all the food he needs.

To enable those skilled in the art to make and use my invention, I will proceed to describe its construction and operation with reference to the drawings.

The cross-bands A are furnished with double sets of sockets $a$, each formed by turning the edges $b$ over and punching holes through large enough to receive the wires, the seam being bent out inwardly and the body of the cross-bands outwardly, as shown in Fig. 4; or the entire socket may be formed by bending the seam in and leaving the outer surface of the cross-band smooth, as shown in Fig. 3. The wires B are placed loosely through these sockets, after which they are secured together at the top in the usual manner by a plate $c$ and eyebolt $d$. The cage is finished without solder. The great advantage of this arrangement is apparent, not only because it saves labor in getting up the cages, but principally because by the use of the solder generally employed in fastening the wires many birds are poisoned.

The bottom C of the cage is secured by extending two or more of the wires B through it. One of these wires is provided with a screw $e$, and one of the legs $f$ forms the nut, as clearly shown in Fig. 1; or it may be fastened in any other convenient manner. The other wire or wires extending through the bottom are bent so as to form hooks $g$, which catch under the bottom and retain it firmly as long as the wires forming the hooks are kept in a position at right angles to the bottom; but if by releasing the screw $e$ one side of the cage is allowed to be lifted and the wires on the other side are brought in an inclined position toward the bottom the hooks can be withdrawn and the bottom removed. It is obvious that instead of the screw $e$ and nut $f$ a simple pin or any other convenient means of fastening might be employed. By these means the entire fastening of the bottom is effected underneath and birds are prevented from getting at the fastening and opening it unawares.

The seed-cup D is secured to the cage in the usual manner and it is provided with a disk E, of glass or any other suitable material, fitting loosely into the inside of the cup. This disk is provided with an opening $h$, through which the bird is enabled to reach the seed, and this opening is so formed that the seat easily ascends to its top edge, as clearly shown in Fig. 1 of the drawings. By these means the bird is enabled to take all the food he wants and still he is prevented from wasting or scattering the seed. The upper surface of the disk is hollowed out toward its circumference, forming a receptacle $i$ to receive the shells, which otherwise would be liable to fall back into the cup. As the seed in the cup diminishes, the disk sinks down by its own gravity, and thus the bird is enabled to entirely empty the cup of its seed.

Having thus fully described my invention, what I claim as new, and desire to secure by Letters Patent, is—

1. The arrangement of the sockets $a$, formed by the edges of the cross-bands A of bird-cages, substantially as and for the purpose described.

2. The perforated disk E in the interior of the seed-cup D, substantially as and for the purpose set forth.

WILLIAM STAEHLEN.

Witnesses:
WM. SINCLAIR,
A. FISHER.